United States Patent
Ozawa

(10) Patent No.: US 9,268,131 B2
(45) Date of Patent: Feb. 23, 2016

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroki Ozawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/740,574

(22) Filed: Jun. 16, 2015

(65) Prior Publication Data

US 2015/0370065 A1 Dec. 24, 2015

(30) Foreign Application Priority Data

Jun. 20, 2014 (JP) ................... 2014-127248

(51) Int. Cl.
*G02B 7/00* (2006.01)
*G02B 26/10* (2006.01)
*G02B 27/00* (2006.01)
*G03G 15/04* (2006.01)

(52) U.S. Cl.
CPC ............ *G02B 26/10* (2013.01); *G02B 27/0006* (2013.01); *G03G 15/04036* (2013.01); *G02B 7/00* (2013.01); *G03G 2221/1654* (2013.01); *G03G 2221/1678* (2013.01)

(58) Field of Classification Search
CPC ................ G03G 15/04036; G03G 2221/1654; G03G 2221/1678; G02B 7/00; G02B 26/10; G02B 27/0006
See application file for complete search history.

(56) References Cited

U.S. PATENT DOCUMENTS

2011/0242265 A1* 10/2011 Takahashi et al. ............... G03G 15/04072
347/263
2015/0062679 A1* 3/2015 Tomioka ................ B41J 2/442
359/204.1

FOREIGN PATENT DOCUMENTS

JP 09-105882 4/1997

\* cited by examiner

*Primary Examiner* — Joseph S Wong
(74) *Attorney, Agent, or Firm* — Wenderoth, Lind & Ponack, L.L.P.

(57) ABSTRACT

An optical scanning device includes a housing and a cover. An engaging hole is formed in the housing and an engaging piece is formed in the cover. The engaging piece has a first portion following a side wall portion of the housing and a second portion folded so as to face the first portion at an interval. When the engaging piece has been inserted into the engaging hole, the first portion is elastically deformed toward the side wall portion of the housing, and the second portion is elastically deformed toward the first portion and abuts a lower portion of an inner edge of the engaging hole, so that the engaging piece and the engaging hole are engaged with each other and the cover is pressed with respect to the housing by the restoring force of the engaging piece.

6 Claims, 9 Drawing Sheets

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-127248 filed on Jun. 20, 2014, the entire contents of which are incorporated herein by reference.

BACKGROUND

The technology of the present disclosure relates to an optical scanning device and an image forming apparatus including the same.

An optical scanning device (an exposure device) installed in an electrophotographic image forming apparatus includes a light source that emits light for exposure and a scanning optical system that deflects and scans the light from the light source onto a surface to be scanned. In addition, the scanning optical system is configured with lenses, mirrors and the like.

Such an optical scanning device has a casing for accommodating the scanning optical system in order to suppress dust from being attached to the lenses and the mirrors. For example, the casing includes a housing having an accommodation area where the scanning optical system is accommodated, and a cover that closes an opening of the accommodation area of the housing.

Herein, when the housing and the cover are firmly and closely adhered to each other, no rattling occurs in the cover and furthermore, there is almost no entrance of dust into the accommodation area of the housing. However, each dimension of the housing and the cover varies within a tolerance range. Consequently, actually, rattling occurs in the cover and dust enters into the accommodation area of the housing.

In this regard, in the aforementioned optical scanning device, there has been proposed to separately provide an elastic member for enhancing an anti-vibration property and a dustproof property in the housing. This elastic member is installed along a peripheral wall of the housing and is elastically engaged with a peripheral wall of the cover mounted to the housing. In the state in which the peripheral wall of the cover has been engaged with the elastic member, the cover is pressed with respect to the housing by elastic force (restoring force) of the elastic member. In this way, an upper end of the peripheral wall of the housing and the cover are closely adhered to each other.

SUMMARY

An optical scanning device according to one aspect of the present disclosure includes a scanning optical system that deflects and scans light emitted from a light source onto a surface to be scanned, a housing having a bottom portion and a side wall portion vertically installed from the bottom portion and accommodating the scanning optical system in a accommodation area surrounded by the bottom portion and the side wall portion, and a cover mounted to the housing from an upper side of the housing to close an opening of the accommodation area. The housing and the cover are respectively provided with a first mounting portion and a second mounting portion mountable to the first mounting portion and the second mounting portion is mounted to the first mounting portion, so that the cover is held so as not to fall from the housing. Furthermore, an engaging hole vertically opened is formed in the housing and an engaging piece inserted into the engaging hole when the cover is mounted to the housing is formed in the cover. The engaging piece has a first portion following the side wall portion of the housing and a second portion folded so as to face the first portion at an interval. Furthermore, when the engaging piece has been inserted into the engaging hole, the first portion is elastically deformed toward the side wall portion of the housing, and the second portion is elastically deformed toward the first portion and abuts a lower portion of an inner edge of the engaging hole. Consequently, the engaging piece and the engaging hole are engaged with each other, and the cover is pressed with respect to the housing by restoring force of the engaging piece.

DETAILED DESCRIPTION

An optical scanning device and an image forming apparatus including the same according to the present embodiment will be described by employing a multifunctional peripheral as an example.

<Entire Configuration of Multifunctional Peripheral>

Figure 1:
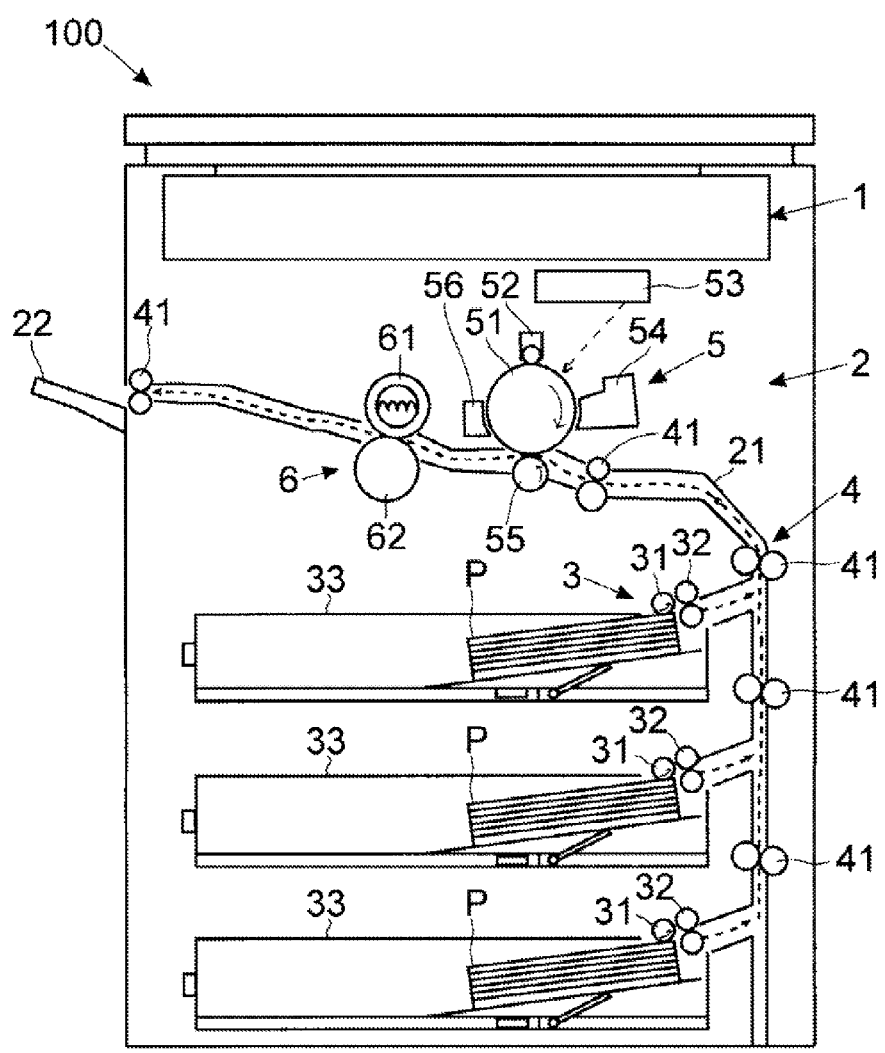
FIG. 1 is a schematic diagram of a multifunctional peripheral (an image forming apparatus) according to the present embodiment.

As illustrated in FIG. 1, a multifunctional peripheral 100 (corresponding to an "image forming apparatus") includes an image reading unit 1 and a print unit 2. The image reading unit 1 reads a document and generates image data. The print unit 2 conveys a sheet P along a sheet conveyance path 21 and forms a toner image on the basis of the image data. Furthermore, the print unit 2 prints the toner image on the sheet P being conveyed and discharges the printed sheet P to a discharge tray 22.

The print unit 2 is configured with a sheet feeding section 3, a sheet conveying section 4, an image forming section 5, and a fixing section 6. The sheet feeding section 3 includes a pick-up roller 31 and a sheet feeding roller pair 32, and supplies a sheet P accommodated in a sheet cassette 33 to the sheet conveyance path 21. The sheet conveying section 4 includes a plurality of conveying roller pairs 41 and conveys the sheep P along the sheet conveyance path 21.

The image forming section 5 includes a photosensitive drum 51, a charging device 52, an exposure device 53 (corresponding to an "optical scanning device"), a developing device 54, a transfer roller 55, and a cleaning device 56.

At the time of image formation, the photosensitive drum 51 rotates and the surface (corresponding to a "surface to be scanned") of the photosensitive drum 51 is electrified by the charging device 52. Furthermore, the exposure device 53 exposes the surface of the photosensitive drum 51 and forms an electrostatic latent image on the surface of the photosensitive drum 51. The developing device 54 supplies toner to the electrostatic latent image formed on the surface of the photosensitive drum 51, thereby developing the electrostatic latent image.

The transfer roller 55 is brought into press-contact with the surface of the photosensitive drum 51, thereby forming a transfer nip between the surface of the photosensitive drum 51 and the transfer roller 55. The sheet P enters into the transfer nip, so that the toner image of the surface of the photosensitive drum 51 is transferred to the sheet P. The cleaning device 56 removes toner and the like remaining on the surface of the photosensitive drum 51.

The fixing section 6 includes a heating roller 61 and a pressing roller 62. The heating roller 61 has a heat generation source therein. The pressing roller 62 is brought into press-contact with the heating roller 61 and forms a fixing nip between the heating roller 61 and the pressing roller 62. Furthermore, the sheet P with the transferred toner image passes through the fixing nip, so that the sheet P is heated and pressed. In this way, the toner image is fixed to the sheet P, so that the print is completed.

<Configuration of Exposure Device>

Figure 2:
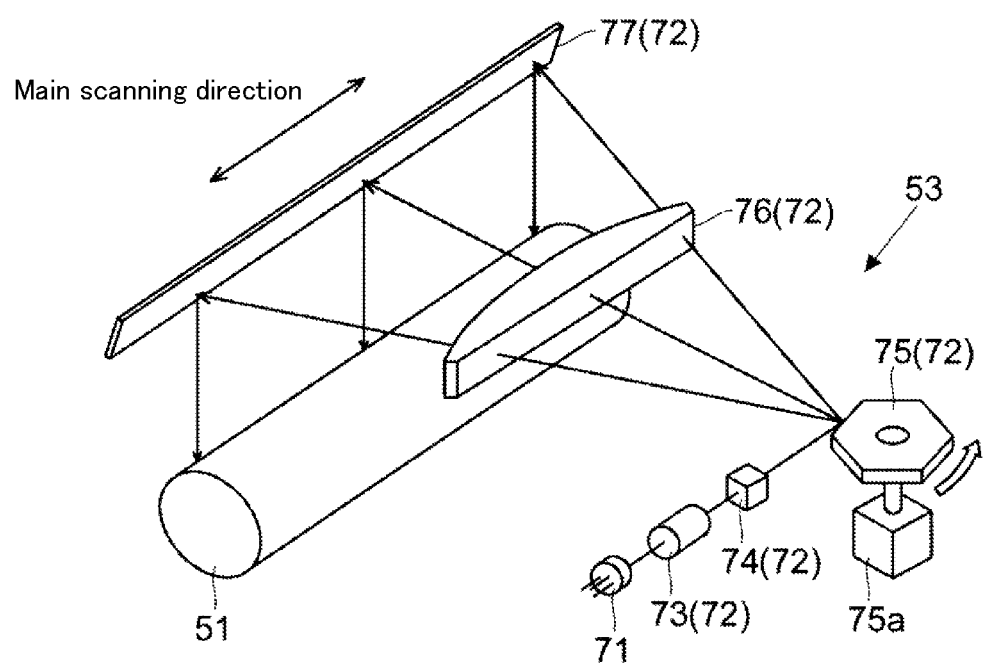
FIG. 2 is a diagram for explaining an internal configuration of an exposure device (an optical scanning device) mounted in a multifunctional peripheral according to the present embodiment.

As illustrated in FIG. 2, the exposure device 53 includes a semiconductor laser element 71 (corresponding to a "light source") and a scanning optical system 72. The semiconductor laser element 71 emits the light for exposure. The scanning optical system 72 includes a collimator lens 73, a cylindrical lens 74, a polygon mirror 75, an Fθ lens 76, a reflective mirror 77 and the like, and deflects and scans the light emitted from the semiconductor laser element 71 onto the surface of the photosensitive drum 51.

The collimator lens 73 converts the light emitted from the semiconductor laser element 71 into parallel light. The cylindrical lens 74 has predetermined refractive force only in a sub-scanning direction perpendicular to a main scanning direction, and forms an image of the light from the collimator lens 73 on a reflective surface of the polygon mirror 75. The polygon mirror 75 is a rotating polygon mirror having a plurality of reflective surfaces, and is rotated by driving force transferred from a polygon motor 75a. Furthermore, the polygon mirror 75 is rotated, so that the light incident into the reflective surfaces is deflected and scanned. The FO lens 76 scans the light from the polygon mirror 75 at a constant speed in the main scanning direction, thereby leading the light to the reflective mirror 77. The reflective mirror 77 reflects the light toward the surface of the photosensitive drum 51, which is a surface to be scanned.

Figure 3:
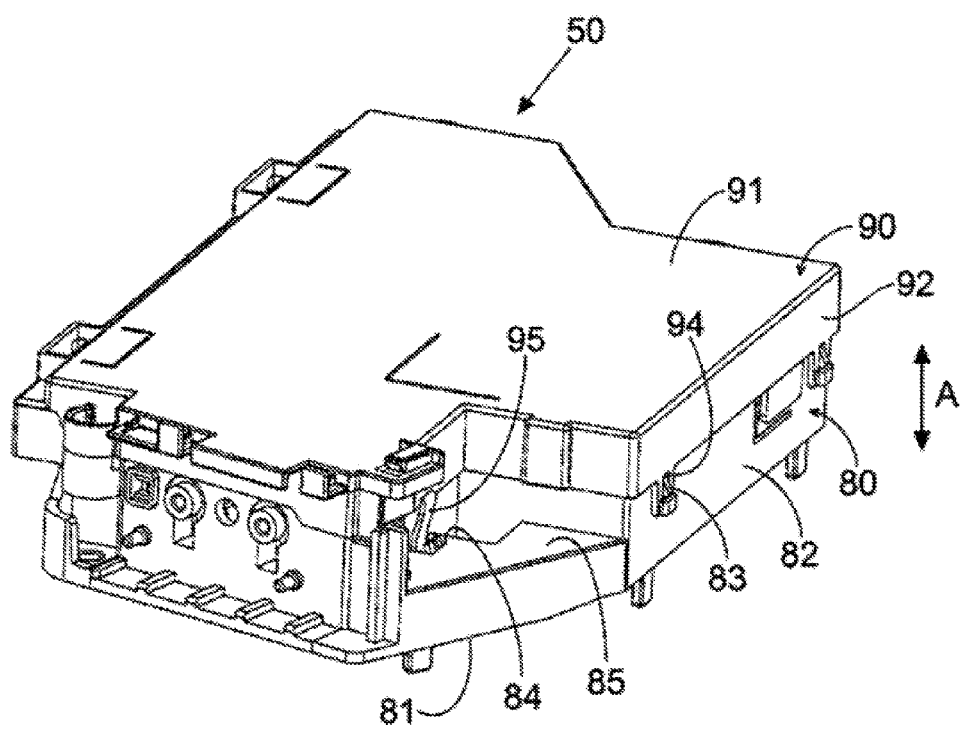
FIG. 3 is a perspective view of a casing (a housing and a cover) in which constituent members of an exposure device illustrated in FIG. 2 are mounted.

Furthermore, the exposure device 53 includes a casing 50 as illustrated in FIG. 3 in order to hold the semiconductor laser element 71 and the scanning optical system 72. The casing 50 is configured with a housing 80 and a cover 90. Hereinafter, the following description will be given by setting an up and down direction of the exposure device 53 as a direction A.

Figure 4:
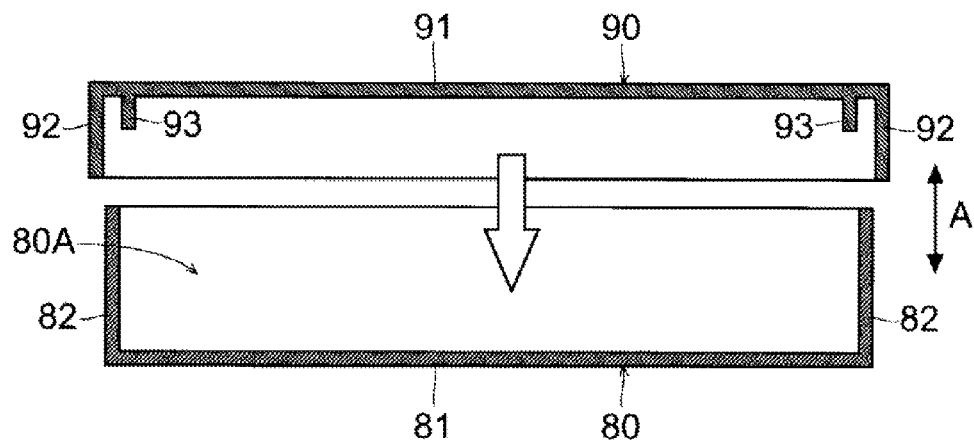
FIG. 4 is a diagram (a diagram before a cover is mounted to a housing) for explaining a configuration of a casing illustrated in FIG. 3.
Figure 5:
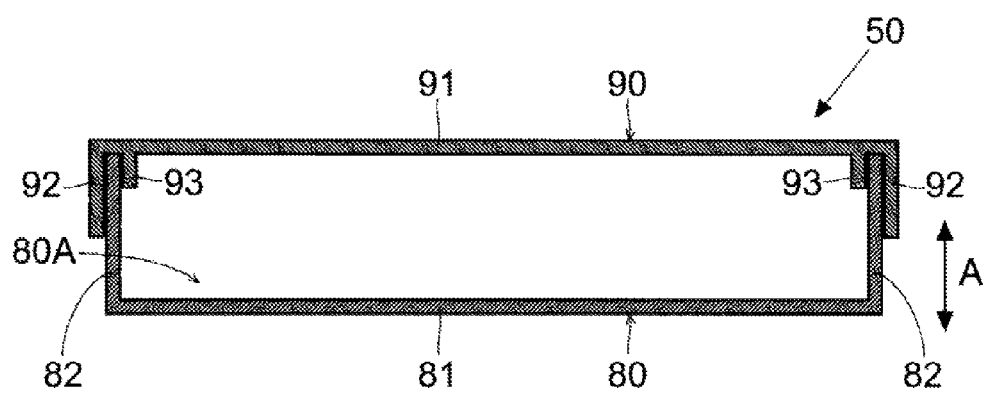
FIG. 5 is a diagram (a diagram after a cover is mounted to a housing) for explaining a configuration of a casing illustrated in FIG. 3.

As illustrated in FIG. 4 and FIG. 5, the housing 80 has a bottom portion 81 and a side wall portion 82 vertically installed from the bottom portion 81 in the direction A (upward). Furthermore, the housing 80 accommodates the scanning optical system 72 in an accommodation area 80A which is an area surrounded by the bottom portion 81 and the side wall portion 82. In addition, the semiconductor laser element 71 is held to the housing 80, but is not accommodated in the accommodation area 80A. Therefore, the light from the semiconductor laser element 71 enters into the accommodation area 80A via an opening (not illustrated) formed in the housing 80.

The cover 90 has a top surface portion 91 and a side wall portion 92 vertically installed from the top surface portion in the direction A (downward). Furthermore, a rib 93 vertically installed in the direction A (downward) is formed at a portion of the top surface portion 91 inward from the side wall portion 92. The cover 90 is mounted to the housing 80, thereby forming the casing 50. Hereinafter, the side wall portion 82 of the housing 80 will be referred to as a housing-side wall portion 82, and the side wall portion 92 of the cover 90 will be referred to as a cover-side wall portion 92.

The cover 90 is mounted to the housing 80 from an upper side (an opening side of the accommodation area 80A) of the housing 80. In this way, the accommodation area 80A is closed by the cover 90 (the top surface portion 91 covers the accommodation area 80A). Furthermore, in the state in which the cover 90 has been mounted to the housing 80, the cover-side wall portion 92 is disposed outward from the housing-side wall portion 82, and the housing-side wall portion 82 is interposed between the cover-side wall portion 92 and the rib 93. As described above, when the housing-side wall portion 82 is interposed between the cover-side wall portion 92 and the rib 93, the entrance of dust (scattered toner and the like) into the accommodation area 80A is suppressed. That is, it is possible to suppress the scanning optical system 72 from being polluted.

In addition, in FIG. 4 and FIG. 5, in order to simplify the drawings, members (the semiconductor laser element 71, the scanning optical system 72 and the like) held to the casing 50 are not illustrated. Furthermore, since FIG. 4 and FIG. 5 are schematic diagrams, they differ from actual shapes and dimensions.

The casing 50 is provided with a falling prevention mechanism for preventing the cover 90 from falling from the housing 80. For example, the falling prevention mechanism is configured by an engaging claw 83 of the housing 80 side and an engaging hole 94 of the cover 90 side as illustrated in FIG. 3. In addition, the engaging claw 83 corresponds to a "first mounting portion" and the engaging hole 94 corresponds to a "second mounting portion".

Figure 6:
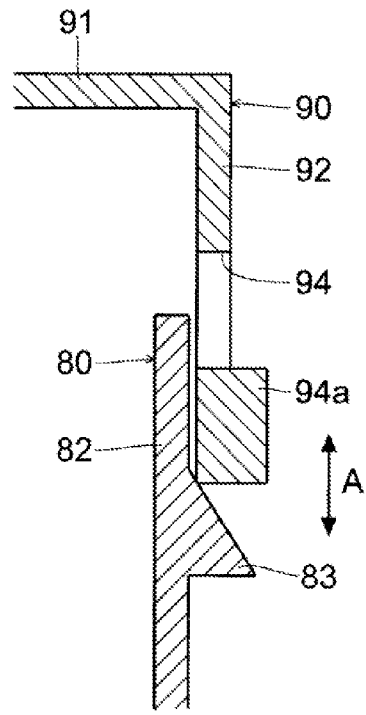
FIG. 6 is a diagram (a diagram before a cover is mounted to a housing) for explaining a configuration of a falling prevention mechanism (a first mounting portion and a second mounting portion) provided in a casing illustrated in FIG. 3.
Figure 7:
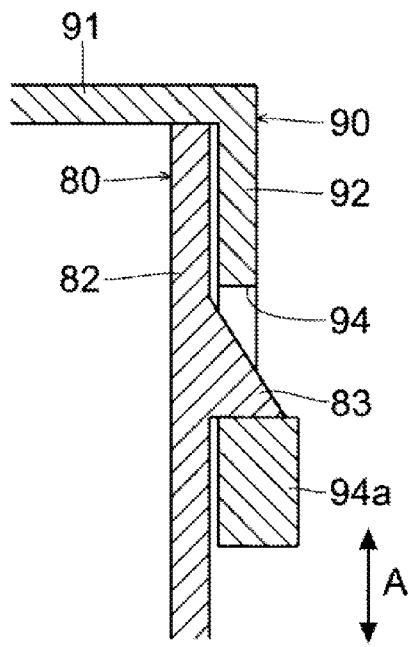
FIG. 7 is a diagram (a diagram after a cover is mounted to a housing) for explaining a configuration of a falling prevention mechanism provided in a casing illustrated in FIG. 3.

As illustrated in FIG. 6 and FIG. 7, the engaging claw 83 is provided to the housing-side wall portion 82 and protrudes outward from the housing-side wall portion 82. Furthermore, the engaging claw 83 has a triangular sectional shape and is formed such that its protrusion amount is gradually increased downward. The engaging hole 94 is provided in the cover-side wall portion 92 and is opened in a thickness direction of the cover-side wall portion 92. In addition, a lower end portion 94a of the engaging hole 94 is formed to be thicker than other portions.

When such a falling prevention mechanism is provided, the cover 90 is mounted to the hosing 80 such that the housing-side wall portion 82 and the cover-side wall portion 92 overlap each other, so that the engaging claw 83 and the engaging hole 94 are engaged with each other. In addition, the reason for allowing the engaging claw 83 to have the triangular sectional shape is for reducing resistance when the cover 90 is mounted to the hosing 80.

In the state in which the engaging claw 83 and the engaging hole 94 have been engaged with each other, when the cover 90 is allowed to move upward, the engaging claw 83 and the lower end portion 94a of the engaging hole 94 abut each other, so that the upward movement of the cover 90 is restricted. In this way, it is possible to suppress the cover 90 from falling from the hosing 80.

In addition, the installation number and the installation place of the falling prevention mechanism are not particularly limited. For example, two falling prevention mechanisms are provided to a side wall of the casing 50 and two falling prevention mechanisms are also provided to a side wall of an opposite side of the side wall. Alternatively, one or a plurality of falling prevention mechanisms may also be provided to all side walls of the casing 50. Moreover, the structure of the falling prevention mechanism is not also particularly limited, and it is sufficient if the falling of the cover 90 from the housing 80 can be suppressed.

Herein, when the engaging claw 83 and the engaging hole 94 are in the engaged state, if an upper end surface of the housing-side wall portion 82 closely adheres to the top surface portion 91, no rattling occurs in the cover 90. However, actually, each dimension of the engaging claw 83 and the engaging hole 94 varies within a tolerance range. Consequently, rattling occurs in the cover 90. Furthermore, a gap may be formed between the upper end surface of the housing-side wall portion 82 and the top surface portion 91, so that dust may enter into the accommodation area 80A from the gap, resulting in the pollution of the scanning optical system 72.

Therefore, the casing 50 is provided with a cover pressing mechanism for pressing the cover 90 with respect to the hosing 80. For example, the cover pressing mechanism is configured by an engaging hole 84 of the housing 80 side and an engaging piece 95 of the cover 90 side as illustrated in FIG. 3.

Figure 8:
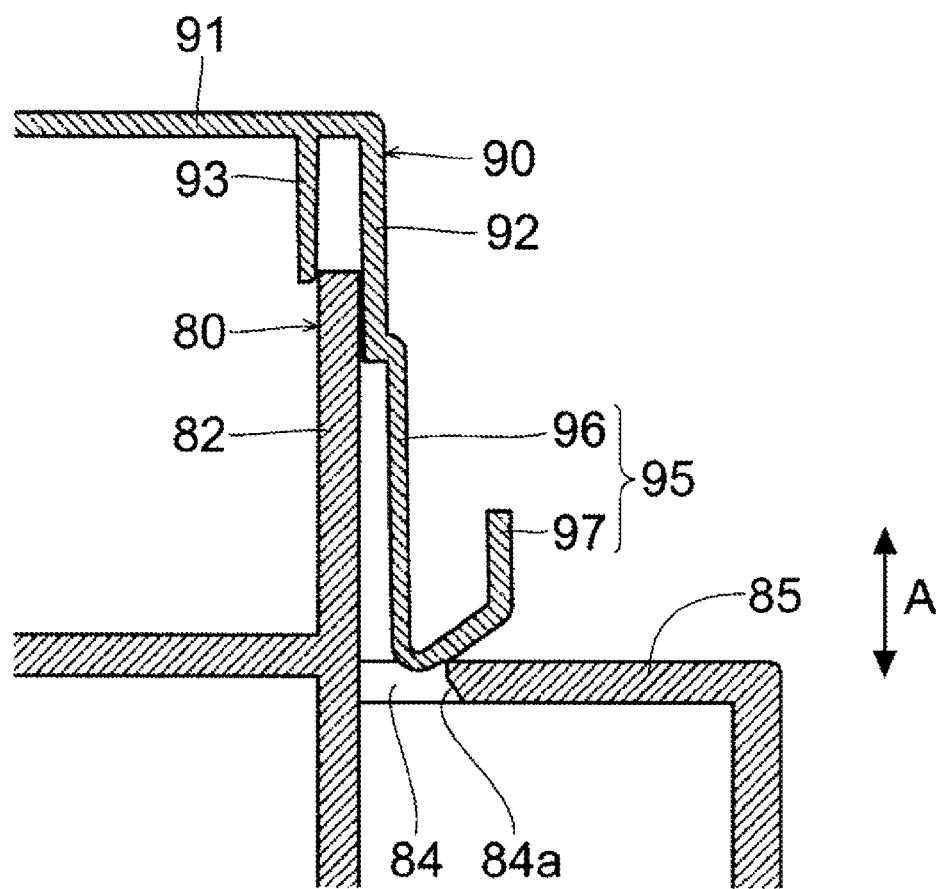
FIG. 8 is a diagram (a diagram before a cover is mounted to a housing) for explaining a configuration of a cover pressing mechanism (an engaging hole and an engaging piece) provided in a casing illustrated in FIG. 3.
Figure 9:
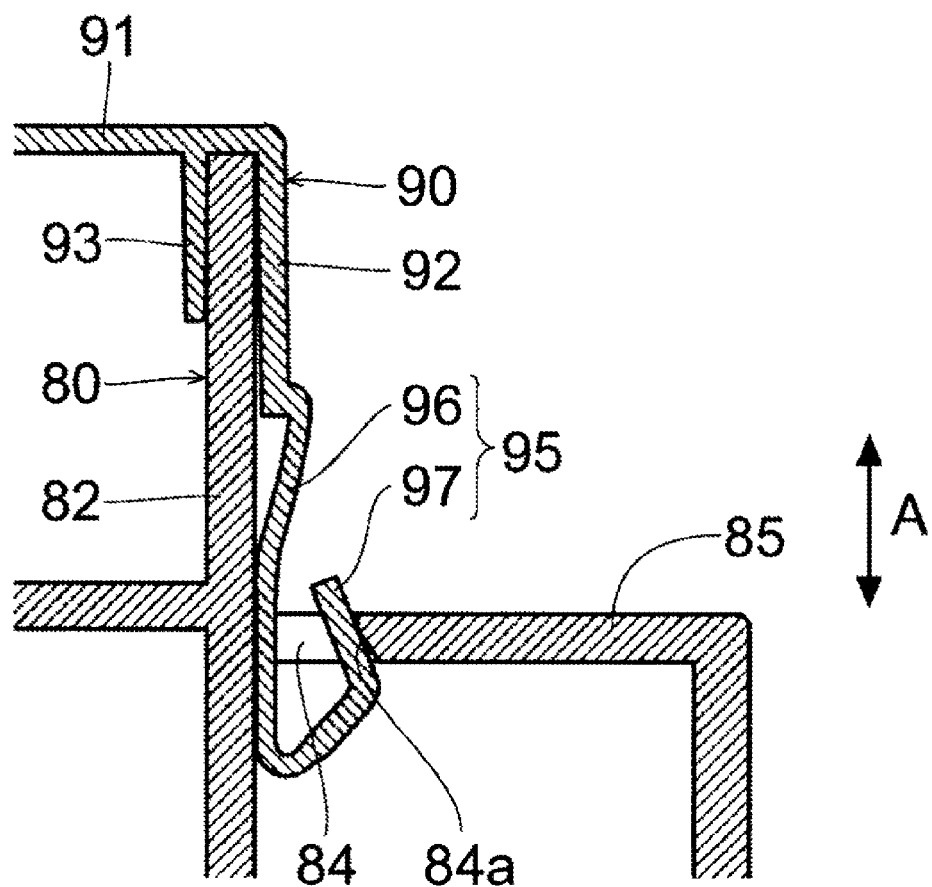
FIG. 9 is a diagram (a diagram after a cover is mounted to a housing) for explaining a configuration of a cover pressing mechanism provided in a casing illustrated in FIG. 3.

As illustrated in FIG. 8 and FIG. 9, a stepped portion 85 having a plane (a stepped surface) approximately vertical to an outer side surface of the housing-side wall portion 82 is integrally formed with a part of the housing-side wall portion 82. A part of the stepped portion 85 is opened in the direction A, and the opening of the stepped portion 85 becomes the engaging hole 84. Furthermore, the opening shape (the planar shape) of the engaging hole 84 is an approximately rectangular shape and one side of the engaging hole 84 contacts with the housing-side wall portion 82 (the housing-side wall portion 82 forms a part of an inner edge of the engaging hole 84).

The engaging piece 95 is integrally formed with the cover-side wall portion 92 so as to be elastically deformable. For example, the engaging piece 95 is made of polycarbonate resin. In addition, constituent material of a body of the cover 90 is also polycarbonate resin and the engaging piece 95 is integrally formed with the body of the cover 90. Furthermore, when the cover 90 is mounted to the housing 80, the engaging piece 95 is inserted into the engaging hole 84 while being elastically deformed, and is finally engaged with the engaging hole 84 (reaches the state of FIG. 9 from FIG. 8).

In detail, the engaging piece 95 has a first portion 96 and a second portion 97. The first portion 96 is connected to the cover-side wall portion 92 and extends in the direction A (downward) from the cover-side wall portion 92. Therefore, when the cover 90 is mounted to the housing 80, the first portion 96 follows an outer side surface of the housing-side wall portion 82.

Moreover, the first portion 96 is formed such that its position (its position when the engaging piece 95 is not inserted into the engaging hole 84) is shifted outward with respect to the cover-side wall portion 92 on the whole. Consequently, in the state in which the engaging piece 95 is not inserted into the engaging hole 84, there is a gap between the housing-side wall portion 82 and the first portion 96 (see FIG. 8). That is, at this time, the first portion 96 is elastically deformable toward the housing-side wall portion 82.

The second portion 97 is connected to a lower end of the first portion 96. Furthermore, the second portion 97 obliquely extends upward from the lower end of the first portion 96 such that an angle between the second portion 97 and the first portion 96 at a connection part with the first portion 96 is an acute angle. In other words, the second portion 97 is a portion folded so as to face the first portion 96 at an interval. In this way, the second portion 97 is elastically deformable toward the first portion 96.

When the cover 90 is adhered to the housing 80, an upper end portion of the housing-side wall portion 82 is first interposed between the cover-side wall portion 92 and the rib 93, and the cover 90 slides downward as is. In this way, the engaging piece 95 enters into the engaging hole 84 and the second portion 97 abuts an inner edge of the engaging hole 84 (see FIG. 8). Thereafter, when the cover 90 is further pressed down and the insertion of the engaging piece 95 into the engaging hole 84 is continued, the second portion 97 is elastically deformed toward the first portion 96, so that the first portion 96 is elastically deformed toward the housing-side wall portion 82. Furthermore, when the cover 90 is pressed down by a predetermined amount, the first portion 96 abuts the housing-side wall portion 82.

When the first portion 96 abuts the housing-side wall portion 82, the first portion 96 is not elastically deformed, but the second portion 97 is continuously and elastically deformed toward the first portion 96. Furthermore, the cover 90 is pressed down until an upper end surface of the housing-side wall portion 82 closely adheres to the top surface portion 91, so that the second portion 97 abuts a lower portion 84a of an inner edge of the engaging hole 84 (see FIG. 9). That is, the engaging hole 84 and the engaging piece 95 are engaged with each other.

As described above, when the engaging hole 84 and the engaging piece 95 are engaged with each other, since the engaging piece 95 is held in the elastically deformed state, restoring force (force by which the engaging piece 95 intends to return to the original shape) is generated in the engaging piece 95. The restoring force of the engaging piece 95 is applied to the lower portion 84a of the inner edge of the engaging hole 84 obliquely in an upward direction. As a consequence, by the restoring force of the engaging piece 95, the cover 90 is pressed down. That is, the cover 90 is pressed with respect to the housing 80. In this way, the upper end surface of the housing-side wall portion 82 closely adheres to the top surface portion 91.

Figure 10:
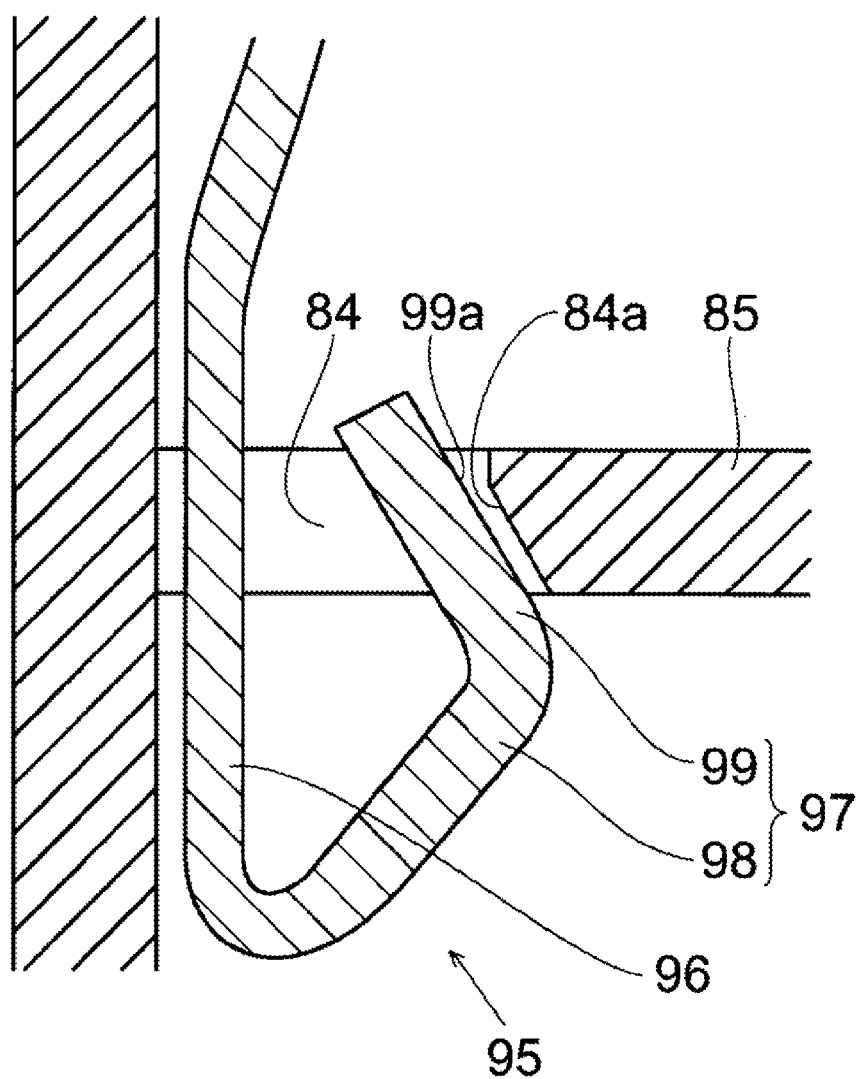
FIG. 10 is an enlarged diagram of an engaging hole and an engaging piece constituting a cover pressing mechanism illustrated in FIG. 9.

Herein, as illustrated in FIG. 10, a part (a part of opposite side of the housing-side wall portion 82 side) of the lower portion 84a of the inner edge of the engaging hole 84 serves as an inclined surface inclined so as to allow an opening area of the engaging hole 84 to be gradually increased downward (is C-chamfered). The inclination of the lower portion 84a (the inclined surface) of the inner edge of the engaging hole 84 is not particularly limited, but, for example, the lower portion 84a is formed to be inclined with respect to the stepped surface (the plane approximately vertical to the outer side surface of the housing-side wall portion 82) of the stepped portion 85 by about 60°. Hereinafter, there is a case in which the lower portion 84a of the inner edge of the engaging hole 84 is called an inclined surface 84a.

Furthermore, the second portion 97 of the engaging piece 95 has a connection portion 98 connected to the first portion 96 and an abutting portion 99 actually abutting the engaging hole 84 to be engaged with the engaging hole 84. Furthermore, when the engaging piece 95 is engaged with the engaging hole 84, one surface 99a (hereinafter, referred to as an abutting surface 99a) of the abutting portion 99 abuts the inclined surface 84a of the engaging hole 84. In addition, in FIG. 10, in order to facilitate the view of the drawing, the inner edge of the engaging hole 84 and the engaging piece 95 are illustrated to be separated from each other.

When the engaging piece 95 is not engaged with the engaging hole 84, the abutting portion 99 extends upward so as to be approximately parallel to the first portion 96. Furthermore, when the abutting surface 99a abuts the inclined surface 84a, the abutting surface 99a is approximately parallel to the inclined surface 84a. In addition, the abutting surface 99a and the inclined surface 84a are not needed to be completely parallel to each other, and, for example, it is sufficient if the deviation of inclination between the abutting surface 99a and the inclined surface 84a is within the range of ±15°.

Figure 11:
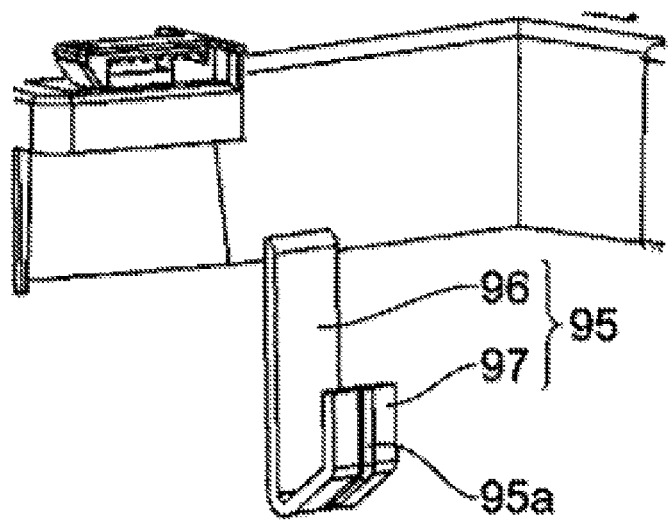
FIG. 11 is perspective view of an engaging piece constituting a cover pressing mechanism provided in a casing illustrated in FIG. 3.
Figure 12:
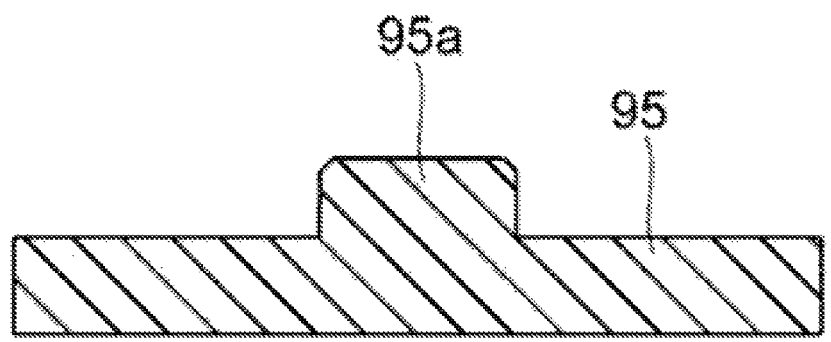
FIG. 12 is a diagram for explaining a sectional shape (a rib shape) of an engaging piece constituting a cover pressing mechanism illustrated in FIG. 11.

Moreover, as illustrated in FIG. 11, on a surface of a side of the engaging piece 95 abutting the housing 80 (the housing-side wall portion 82 and the inner edge of the engaging hole 84), a rib 95a protruding from the surface is formed to extend in the direction A. The rib 95a of the engaging piece 95, for example, has a sectional shape of an approximately rectangular shape (also including chamfered corner portions) as illustrated in FIG. 12. In addition, the sectional shape of the rib 95a of the engaging piece 95 is not particularly limited, and may also be an approximately hemispheric shape. The sectional shape may also be an approximately triangular shape. Furthermore, the rib 95a of the engaging piece 95 may also be formed over the second portion 97 from the first portion 96, or may also be formed only in the second portion 97. When such a rib 95a is formed in the engaging piece 95, since the rib 95a abuts the inner edge of the engaging hole 84, the portions of the engaging piece 95, except for the rib 95a, do not abut the housing 80.

As described above, the exposure device 53 (the optical scanning device) of the present embodiment includes the scanning optical system 72 that deflects and scans light emitted from the semiconductor laser element 71 (the light source) onto the surface (the surface to be scanned) of the photosensitive drum 51, the housing 80 having the bottom portion 81 and the housing-side wall portion 82 (the side wall portion) vertically installed from the bottom portion 81 in the direction A (the up and down direction) and accommodating the scanning optical system 72 in the accommodation area 80A surrounded by the bottom portion 81 and the housing-side wall portion 82, and the cover 90 mounted to the housing 80 from the upper side of the housing 80 to close the opening of the accommodation area 80A. The housing 80 and the cover 90 are respectively provided with the engaging claw 83 (the first mounting portion) and the engaging hole 94 (the second mounting portion) mountable to the engaging claw 83, and the engaging hole 94 is mounted to the engaging claw 83, so that the cover 90 is held so as not to fall from the housing 80. Furthermore, the engaging hole 84 opened in the direction A is formed in the housing 80, and the engaging piece 95 inserted into the engaging hole 84 when the cover 90 is mounted to the housing 80 is formed in the cover 90. The engaging piece 95 has the first portion 96 following the housing-side wall portion 82 and the second portion 97 folded so as to face the first portion 96 at an interval. Furthermore, when the engaging piece 95 has been inserted into the engaging hole 84, the first portion 96 is elastically deformed toward the housing-side wall portion 82, and the second portion 97 is elastically deformed toward the first portion 96 and abuts the lower portion 84a of the inner edge of the engaging hole 84, so that the engaging piece 95 and the engaging hole 84 are engaged with each other and the cover 90 is pressed with respect to the housing 80 by the restoring force of the engaging piece 95.

In the configuration of the present embodiment, when the engaging piece 95 of the cover 90 has been inserted into the engaging hole 84 of the housing 80 (when the cover 90 has been mounted to the housing 80), since the engaging piece 95 is elastically deformed and the cover 90 is pressed with respect to the housing 80 by the restoring force of the engaging piece 95, the cover 90 is firmly and closely adhered to the housing 80. In this way, even though a member for enhancing an anti-vibration property and a dustproof property is not separately provided, it is possible to suppress rattling from occurring in the cover 90 or dust from entering into the accommodation area 80A of the housing 80.

Furthermore, in this configuration, the first portion 96 and the second portion 97 are provided to the engaging piece 95, the second portion 97 is allowed to have a shape folded so as to face the first portion 96 at an interval, and a plurality of places of the engaging piece 95 are elastically deformed, so that it is possible to increase the elastic force of the engaging piece 95 without increasing the size of the engaging piece 95 in the direction A. That is, it is possible to firmly press the cover 90 with respect to the housing 80 without increasing the size of the engaging piece 95 in the direction A. Moreover, when a plurality of places of the engaging piece 95 are allowed to be elastically deformed, it is possible to suppress the occurrence of a problem that the engaging piece 95 is easily broken because stress is concentrated on a predetermined one place.

Furthermore, in the present embodiment, as described above, the lower portion 84a of the inner edge of the engaging hole 84 serves as the inclined surface inclined so as to allow the opening area of the engaging hole 84 to be gradually increased downward. Furthermore, the second portion 97 abuts the inclined surface 84a, so that the engaging hole 84 and the engaging piece 95 are engaged with each other. According to such a configuration, when the engaging hole 84 and the engaging piece 95 have been engaged with each other and the engaging piece 95 has been elastically deformed (when the second portion 97 has abutted the lower portion 84a of the inner edge of the engaging hole 84), it is possible to firmly press the cover 90 with respect to the housing 80 by the restoring force of the engaging piece 95.

Furthermore, in the present embodiment, as described above, when the abutting surface 99a of the abutting portion 99 of the second portion 97, which abuts the inclined surface 84a of the engaging hole 84, has abutted the inclined surface 84a, the abutting surface 99a is approximately parallel to the inclined surface 84a. According to such a configuration, since a contact area of the engaging hole 84 and the engaging piece 95 is increased, a good engaged state is held.

Furthermore, in the present embodiment, as described above, on the surface of the side of the engaging piece 95 abutting the inner edge of the engaging hole 84, the rib 95a protruding from the surface is formed. According to such a configuration, when the engaging piece 95 is inserted into the engaging hole 84, since the contact area of the engaging hole and the engaging piece 95 is reduced, resistance becomes small, so that the insertion of the engaging piece 95 into the engaging hole 84 is facilitated.

Furthermore, in the present embodiment, as described above, at the connection part of the first portion 96 and the second portion 97, an angle between the first portion 96 and the second portion 97 is an acute angle. According to such a configuration, the insertion of the engaging piece 95 into the engaging hole 84 is facilitated, resulting in the improvement of assembling efficiency.

It should be noted that the embodiments disclosed herein are illustrative in all respects and are not restrictive. The technical scope of the present disclosure is defined by the scope of the appended claims rather than the description of the aforementioned embodiments, and is intended to include all modifications within the meaning and scope equivalent to the scope of the appended claims.

What is claimed is:

1. An optical scanning device comprising:
    a scanning optical system that deflects and scans light emitted from a light source onto a surface to be scanned;
    a housing having a bottom portion and a side wall portion vertically installed from the bottom portion and accommodating the scanning optical system in a accommodation area surrounded by the bottom portion and the side wall portion; and
    a cover mounted to the housing from an upper side of the housing to close an opening of the accommodation area,
    wherein the housing and the cover are respectively provided with a first mounting portion and a second mounting portion mountable to the first mounting portion and the second mounting portion is mounted to the first mounting portion, so that the cover is held so as not to fall from the housing,
    an engaging hole vertically opened is formed in the housing and an engaging piece inserted into the engaging hole when the cover is mounted to the housing is formed in the cover,
    the engaging piece has a first portion following the side wall portion of the housing and a second portion folded so as to face the first portion at an interval,
    when the engaging piece has been inserted into the engaging hole, the first portion is elastically deformed toward the side wall portion of the housing, and the second portion is elastically deformed toward the first portion and abuts a lower portion of an inner edge of the engaging hole, so that the engaging piece and the engaging hole are engaged with each other, and
    the cover is pressed with respect to the housing by restoring force of the engaging piece.

2. The optical scanning device of claim 1, wherein the lower portion of the inner edge of the engaging hole serves as an inclined surface inclined so as to allow an opening area of the engaging hole to be gradually increased downward, and the second portion abuts the inclined surface, so that the engaging piece and the engaging hole are engaged with each other.

3. The optical scanning device of claim 2, wherein, when an abutting surface of the second portion, which abuts the inclined surface, has abutted the inclined surface, the abutting surface is approximately parallel to the inclined surface.

4. The optical scanning device of claim 1, wherein, on a surface of a side of the engaging piece abutting the inner edge of the engaging hole, a rib protruding from the surface is formed.

5. The optical scanning device of claim 1, wherein, at a connection part of the first portion and the second portion, an angle between the first portion and the second portion is an acute angle.

6. An image forming apparatus comprising the optical scanning device of claim 1.

* * * * *